(12) United States Patent
Mohan et al.

(10) Patent No.: US 8,180,349 B1
(45) Date of Patent: May 15, 2012

(54) METHOD AND SYSTEM FOR HANDOFF CONTROLLER-MEDIATED HANDOFF OF A MOBILE NODE

(75) Inventors: David Mohan, Overland Park, KS (US); Tong Zhou, Overland Park, KS (US)

(73) Assignee: Sprint Spectrum L.P.

( * ) Notice: Subject to any disclaimer, the term of this patent is extended or adjusted under 35 U.S.C. 154(b) by 876 days.

(21) Appl. No.: 11/291,947

(22) Filed: Dec. 1, 2005

(51) Int. Cl.
  *H04W 36/00* (2009.01)
  *H04M 1/00* (2006.01)
  *H04W 4/00* (2009.01)

(52) U.S. Cl. ............ 455/437; 455/435.1; 455/436; 455/426.1; 455/552.1; 370/331; 370/338; 370/328

(58) Field of Classification Search ............ 455/552.1, 455/553.1, 426.1, 432.1–444; 370/331
See application file for complete search history.

(56) References Cited

U.S. PATENT DOCUMENTS

| | | | | |
|---|---|---|---|---|
| 5,659,598 | A * | 8/1997 | Byrne et al. | 455/436 |
| 6,424,638 | B1 * | 7/2002 | Ray et al. | 370/331 |
| 6,768,726 | B2 | 7/2004 | Dorenbosch et al. | |
| 6,909,899 | B2 | 6/2005 | Wang et al. | |
| 6,950,657 | B1 | 9/2005 | Hiller et al. | |
| 7,299,046 | B1 * | 11/2007 | Ozugur et al. | 455/439 |
| 2002/0068570 | A1 * | 6/2002 | Abrol et al. | 455/438 |
| 2003/0119489 | A1 * | 6/2003 | Mohammed | 455/561 |
| 2004/0008645 | A1 | 1/2004 | Janevski et al. | |
| 2004/0052238 | A1 * | 3/2004 | Borella et al. | 370/349 |
| 2004/0082330 | A1 * | 4/2004 | Marin | 455/438 |
| 2004/0087307 | A1 * | 5/2004 | Ibe et al. | 455/436 |
| 2004/0137902 | A1 * | 7/2004 | Chaskar et al. | 455/436 |
| 2004/0218566 | A1 | 11/2004 | Han | |
| 2005/0053034 | A1 | 3/2005 | Chiueh | |
| 2005/0130660 | A1 | 6/2005 | Park et al. | |
| 2005/0227691 | A1 * | 10/2005 | Pecen et al. | 455/435.2 |
| 2005/0266845 | A1 * | 12/2005 | Aerrabotu et al. | 455/436 |
| 2006/0203776 | A1 * | 9/2006 | Persaud et al. | 370/331 |

OTHER PUBLICATIONS

W. Simpson, "The Point-to-Point Protocol (PPP)," Request for Comments 1661, Jul. 1994.
W. Simpson, "PPP Challenge Handshake Authentication Protocol (CHAP)," Request for Comments 1994, Aug. 1996.
C. Perkins, "IP Mobility Support," Request for Comments 2002, Oct. 1996.
C. Rigney, et al., "Remote Authentication Dial in User Service (RADIUS)," Request for Comments 2865, Jun. 2000.

* cited by examiner

*Primary Examiner* — Lester Kincaid
*Assistant Examiner* — Daniel Lai

(57) ABSTRACT

A mobile node in communication with a first wireless system detects a handoff condition and responsively transmits a handoff request to a handoff controller. In response to the handoff request, the handoff controller selects a second wireless system for the mobile node and establishes a packet registration with the second wireless system on behalf of the mobile node. When the registration process is completed, the handoff controller transmits a handoff instruction to the mobile node. The mobile node may then acquire a radio link with the second wireless system and use the packet registration established by the handoff controller to send and/or receive packets via the second wireless system.

19 Claims, 3 Drawing Sheets

METHOD AND SYSTEM FOR HANDOFF CONTROLLER-MEDIATED HANDOFF OF A MOBILE NODE

BACKGROUND

1. Field of the Invention

The present invention relates to telecommunications and, more particularly, to methods and systems in which a handoff controller mediates a handoff of a mobile node.

2. Description of Related Art

Mobile devices are increasingly using wireless systems to send and receive voice, data, and other media in packet-data form. Such wireless systems may include, for example, wireless local area networks (WLANs) and wireless wide area networks (WWANs). WLANs may use protocols, such as 802.11, HiperLAN, HomeRF, or Bluetooth for air interface communications. WWANs may use protocols, such as EV-DO, cdma2000, or GSM for air interface communications. In a WLAN, wireless coverage may be provided by one or more wireless access points. In a WWAN, wireless coverage may be provided by one or more base transceiver stations (BTSs). The wireless coverage provided by a wireless system may effectively cover only a limited area, for example, based on the power at which wireless signals are transmitted and the presence of buildings or other obstructions. The coverage area provided by a wireless access point in a WLAN may be particularly limited. For example, the effective range of a wireless access point using 802.11 may be up to 100 meters indoors or 300 meters outdoors.

As a mobile device moves out of the wireless coverage area provided by a first wireless system, a handoff to a second wireless system may be possible. If the mobile device was engaged in a communication session via the first wireless system, the handoff may enable the mobile device to continue the communication session via the second wireless system.

In order to be able to continue the communication session via the second wireless system, the mobile device may first need to be authenticated by the second wireless system and become registered with the second wireless system for packet-data services. Such steps can cause an undesirable amount of delay. The delay may be perceived as latency by the user. Moreover, the delay can cause dropped packets or dropped calls.

Accordingly, there is a need to provide methods and systems that can facilitate more efficient handoffs.

SUMMARY

In a first principal aspect, an exemplary embodiment of the present invention provides a handoff method for a mobile node that is in communication with a first wireless system. In accordance with the method, a handoff controller receives a handoff request from the mobile node. In response to the handoff request, the handoff controller establishes a packet registration with the second wireless system on behalf of the mobile node. The handoff controller then transmits a handoff instruction to the mobile node.

In a second principal aspect, an exemplary embodiment of the present invention provides a system for controlling a handoff of a mobile node from a first wireless system to a second wireless system. The system comprises a handoff controller, wherein, in response to receiving a handoff request from the mobile node, the handoff controller establishes a packet registration with the second wireless system on behalf of the mobile node and transmits a handoff instruction to the mobile node.

In a third principal aspect, an exemplary embodiment of the present invention provides a handoff method for a mobile node that is in communication with a first wireless system. In accordance with the method, the mobile node detects a handoff condition and responsively transmits a handoff request to a handoff controller. The mobile node receives an authentication challenge from the handoff controller. The mobile node responsively transmits an authentication response to the handoff controller, wherein the authentication response includes an encrypted password. The mobile node then receives a handoff instruction from the handoff controller.

DETAILED DESCRIPTION OF EXEMPLARY EMBODIMENTS

1. Overview

Figure 1:
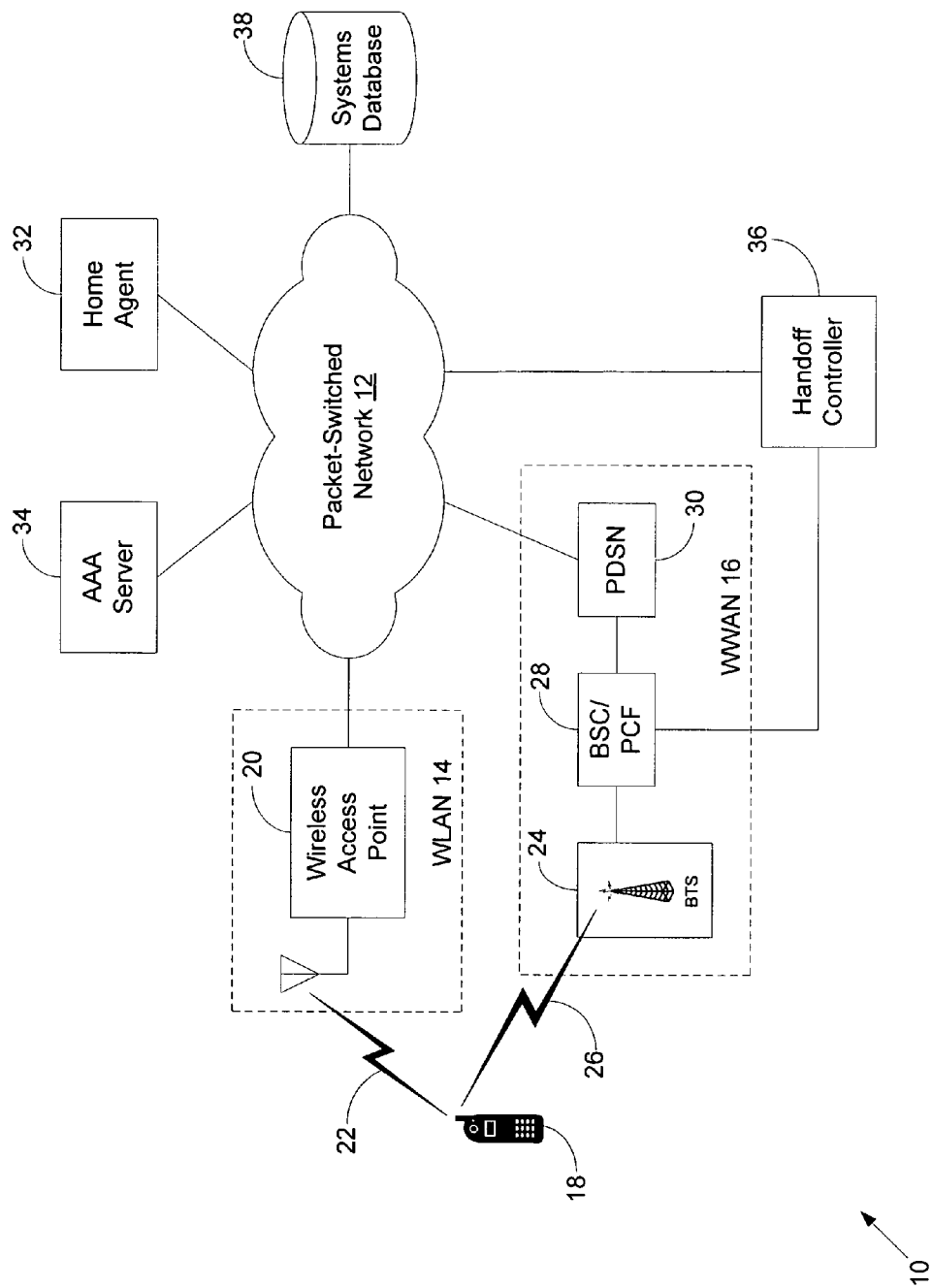
FIG. 1 is a simplified block diagram of a wireless telecommunications network, in accordance with an exemplary embodiment of the present invention.

The present invention, in exemplary embodiments, provides methods and systems for facilitating a handoff of a mobile node from a first wireless system to a second wireless system. The first wireless system could be, for example, a wireless access point of a wireless local area network (WLAN). The second wireless system could be part of a wireless wide area network (WWAN). For example, the second wireless system could include a base transceiver station (BTS) communicatively coupled to a base station controller (BSC). The BSC could, in turn, include a packet control function (PCF) that is communicatively coupled to a packet data serving node (PDSN).

The mobile node could be a wireless telephone, wirelessly-equipped laptop computer or personal digital assistant (PDA), or other wireless communication device. The mobile node may be able to communicate with the first wireless system using a first air interface protocol, such as an 802.11 protocol. The mobile node may be able to communicate with the second wireless system using a second air interface protocol, such as EV-DO, cdma2000, or GSM.

In an exemplary embodiment, a handoff of the mobile node, e.g., from the first wireless system to a second wireless system, is mediated by a handoff controller. For example, when the mobile node detects a handoff condition, the mobile node may transmit a handoff request to the handoff controller via the first wireless system and then wait to receive a handoff instruction from the handoff controller before connecting to the second wireless system. The mobile node may detect a handoff condition in different ways. For example, the mobile node may compare a signal level of the first wireless system with a predetermined threshold value. If the signal level reaches or falls below the predetermined threshold value, a handoff condition may be indicated. This may occur, for example, when the mobile node is in the process of moving out of the wireless coverage area of the first wireless system.

When the handoff controller receives the handoff request from the mobile node, the handoff controller may select a second wireless system for the mobile node. The handoff controller may select the second wireless system based on information contained in the handoff request. For example, the handoff request may include a service set identifier (SSID) and/or medium access control (MAC) address of the first wireless system. The handoff controller may then select a second wireless system that covers the same area as the first wireless system. To do this, the handoff controller may consult a systems database that stores information regarding wireless systems. For example, if the first wireless system is a WLAN system, the systems database may store information that can be used to determine which WWAN system has a service area that encompasses a given WLAN system, e.g., identified by SSID or MAC address. The handoff controller can then use the SSID or MAC address provided in the handoff request to look up which WWAN system covers the same area. The systems database could be integrated with the handoff controller, or the systems database could be a separate network element.

Alternatively, the handoff request may include other information that the handoff controller can use to select a second wireless system for the mobile node. For example, the mobile node may determine its location, using the Global Positioning System (GPS) or other positioning technology, and include this location in the handoff request. The handoff controller may then consult a systems database to determine which wireless system serves the mobile node's location.

In another approach, the handoff request may include information regarding candidate wireless systems that the handoff controller could select as the second wireless system. For example, if the first wireless system is a WLAN system, the mobile node may monitor the signal strengths from one or more WWAN systems. The mobile node may determine the best candidate WWAN system or systems based on the signal strength measurements and identify the best candidate WWAN system(s) in the handoff request. The handoff request may identify the WWAN systems by SID/NID, packet zone identification (PZID), or in some other manner. The handoff request could also include the signal strength measurements that the mobile node made on the WWAN systems.

After selecting the second wireless system, the handoff controller may then establish a packet registration with the second wireless system on behalf of the mobile node. To do this, the handoff controller may act as a proxy for the mobile node, transmitting signals to the second wireless system and responding to signals from the second wireless system as if the handoff controller were the mobile node. In these communications, the handoff controller may use some or all of the mobile node's credentials, such as the mobile node's IP address, network access identifier (NAI), and home agent address. The mobile node may send these credentials to the handoff controller either in the handoff request or in an earlier registration step. When the handoff controller does not have a necessary credential, the handoff controller may forward signaling to the mobile node and then forward the mobile node's response to the second wireless system. For example, the handoff controller might not store the mobile node's password.

The process of establishing the packet registration may involve several steps. For example, the handoff controller may first establish a data link with a PDSN via a PCF of the second wireless system using the Point-to-Point Protocol (PPP). An authentication step may be required in order to complete the establishment of the data link. For example, the PDSN may issue an authentication challenge in accordance with the Challenge Handshake Authentication Protocol (CHAP). The handoff controller may forward the authentication challenge to the mobile node. The mobile node may generate an authentication response, e.g., by encrypting the user's NAI and password, and transmit the response to the handoff controller. The handoff controller may then forward the authentication response to the PDSN. A recent version of PPP is described in W. Simpson, "The Point-to-Point Protocol (PPP)," Request For Comments 1661, July 1994, which is incorporated herein by reference. A recent version of CHAP is described in W. Simpson, "PPP Challenge Handshake Authentication Protocol (CHAP)," Request For Comments 1994, August 1996, which is incorporated herein by reference.

Once the data link is established, the handoff controller may register the mobile node's IP address in a Mobile IP registration process. For example, the handoff controller may transmit a Mobile IP Registration Request to the PDSN, via the PCF. The PDSN may function as a foreign agent for the second wireless system and transmit a Mobile IP Registration Request to the mobile node's home agent. Upon successful registration, the home agent may update its mobility binding list to store an association between the mobile node's IP address and a care-of address associated with the PDSN. In addition, the PDSN and PCF may also store associations for the mobile node, e.g., in a visitor binding list. For example, the PDSN and PCF may associate the mobile node's mobile directory number (MDN), IP address, and NAI.

As a result of these associations, when the home agent receives packets that have the mobile node's IP address as destination address, the home agent may forward the packets to the PDSN, as the foreign agent serving the second wireless system. The PDSN, in turn, will forward packets that have the mobile node's IP address as destination address to the PCF for delivery to the mobile node. In addition, the PCF and PDSN will recognize packets from the mobile node's IP address as originating from an authorized and registered mobile node.

Once the packet registration is established, the handoff controller may transmit a handoff instruction to the mobile node. The handoff instruction may instruct the mobile node to change its point of connection from the first wireless system to the second wireless system. In some cases, the handoff instruction may include an identification of the second wireless system. In other cases, the handoff instruction might not identify the second wireless system.

Identifying the second wireless system to the mobile node might not be needed for various reasons. As one example, the mobile node may have already identified the second wireless system in the handoff request. As another example, if the second wireless system is a WWAN system, the mobile node may use a preferred roaming list (PRL) to determine which WWAN system serves the area. In this way, the mobile node may be able to select the same WWAN system and connect to the same PCF that the handoff controller selected for the mobile node.

In response to the handoff instruction, the mobile node may then acquire a radio link with the second wireless system and use the packet registration established by the handoff controller to send and/or receive packets via the second wireless system. To acquire the radio link, the mobile node may transmit an origination request, and the second wireless system may treat the mobile node as if it were re-connecting from a dormant state.

In this way, the handoff controller can establish a packet registration with the second wireless system before the mobile node actually begins communicating with the second wireless system. This approach can beneficially reduce latencies caused by the handoff process. For example, the mobile node can still use the first wireless system to send and receive packets while the handoff controller establishes the packet registration with the second wireless network. Once the packet registration with the second wireless system is complete, the mobile node may only need to acquire a radio link with the second wireless system to complete the handoff. The mobile node can then use the packet registration that the handoff controller already established. Thus, by having the handoff controller establish the packet registration in advance, the overall time required to complete the handoff may be reduced.

2. Exemplary Network Architecture

FIG. 1 illustrates an exemplary wireless telecommunications system 10. System 10 includes a packet-switched network 12 that is communicatively coupled to at least a first wireless system and a second wireless system. Packet-switched network 12 may include one or more public networks, such as the Internet, and/or one or more private networks. Packets may be routed in packet-switched network 12 using protocols such as the Internet Protocol (IP), Transmission Control Protocol (TCP), and the User Datagram Protocol (UDP).

In the example shown in FIG. 1, packet-switched network 12 is communicatively coupled to a wireless local area network (WLAN) 14 and a wireless wide area network (WWAN) 16. It is to be understood, however, that this configuration is exemplary only, as packet-switched network 12 could be communicatively coupled to other types of wireless systems.

WLAN 14 and WWAN 16 may provide mobile nodes, such as mobile node 18, with wireless packet-based communication service, through which the mobile nodes may send and receive voice, data, video and/or other media via an air interface. Mobile node 18 could be, for example, a wireless telephone, wireless personal digital assistant (PDA) or other wireless communication devices. As described in more detail below, mobile node 18 may use different air interface protocols for communicating with WLAN 14 and WWAN 16.

WLAN 14 may include one or more wireless access points, as represented in FIG. 1 by wireless access point 20. Wireless access point 20 may provide a wireless coverage area within which wireless access point 20 can communicate with mobile nodes, such as mobile node 18, via an air interface 22. The communications between mobile node 18 and wireless access point 20 may use an air interface protocol such as 802.11, HiperLAN, HomeRF, or Bluetooth.

WWAN 16 may include one or more base transceiver stations (BTSs), as represented in FIG. 1 by BTS 24. BTS 24 may provide a wireless coverage area within which BTS 24 can communicate with mobile nodes 18, via an air interface 26. The communications between mobile node 18 and BTS 24 may use an air interface protocol, such as EV-DO, cdma2000, or GSM.

In an exemplary embodiment, the wireless coverage areas provided by wireless access point 20 and BTS 24 are overlapping. In this way, mobile node 18 may change its connectivity from wireless access point 20 to BTS 24 (or vice versa) to effect a handoff from WLAN 14 and WWAN 16 (or vice versa), as described in more detail below.

BTS 24 may be controlled by a base station controller (BSC) 28. BSC 28 may also include a packet control function (PCF). Alternatively, the PCF could be located in a network element separate from BSC 28. BSC/PCF 28 may, in turn, be communicatively coupled to a packet-data serving node (PDSN) 30, which may be communicatively coupled to packet-switched network 12. Although FIG. 1 shows WWAN 16 with only one BSC/PCF and one BTS, it is to be understood that PDSN 30 could be communicatively coupled to more than one BSC/PCF, and each BSC/PCF could be communicatively coupled to more than one BTS.

In an exemplary embodiment, mobile node 18 uses Mobile IP. An exemplary Mobile IP approach is described in C. Perkins, "IP Mobility Support," Request For Comments 2002, October 1996, which is incorporated herein by reference. Using Mobile IP, mobile node 18 may change its network connectivity while keeping the same IP address, the "home address" of mobile node 18. In addition, mobile node 18 may have a home agent 32 that keeps track of the network connectivity of mobile node 18. In particular, home agent 32 may maintain an association between the home address of mobile node 18 and a care-of address that can be used to reach mobile node 18. In this way, when home agent 32 receives packets that have the home address of mobile node 18 as destination address, home agent 32 may forward the packets to the associated care-of address for mobile node 18.

The care-of address may correspond to a foreign agent that serves the network or subnetwork to which mobile node 18 is currently connected. With reference to FIG. 1, wireless access point 20 may function as a foreign agent in WLAN 14, and PDSN 30 may function as a foreign agent in WWAN 16. Thus, when mobile node 18 is in communication with wireless access point 20, home agent 32 may store an association between the home address of mobile node 18 and a care-of address corresponding to wireless access point 20. When mobile node 18 is in communication with BTS 24, home agent 32 may store an association between the home address of mobile node 18 and a care-of address corresponding to PDSN 30.

Wireless access point 20, PDSN 30, and home agent 32 may be able to communicate via packet-switched network 12. In addition, wireless access point 20 and PDSN 30 may communicate with an authentication, authorization, and accounting (AAA) server 34, for example, in order to authenticate mobile nodes, such as mobile node 18. Wireless access point 20 and PDSN 30 may communicate with AAA server 34 using a protocol such as RADIUS or DIAMETER. A recent version of the RADIUS protocol is described in C. Rigney, et al., "Remote Authentication Dial In User Service (RADIUS)," Request For Comments 2865, June 2000, which is incorporated herein by reference.

In accordance with an exemplary embodiment of the present invention, wireless telecommunications system 10 also includes a handoff controller 36. Handoff controller 36 may be communicatively coupled to BSC/PCF 28 and to packet-switched network 12. Handoff controller 36 may function to mediate handoffs between wireless systems, for example, between WLAN 14 and WWAN 16, as described in more detail below.

Handoff controller 36 may access a systems database 38 that stores information regarding wireless systems. For example, systems database 38 may specify which wireless systems serve which areas. Systems database 38 could be a network element separate from handoff controller 36, as shown in FIG. 1. Alternatively, systems database 38 could be integrated with handoff controller 36.

3. Exemplary Operation

Figure 2:
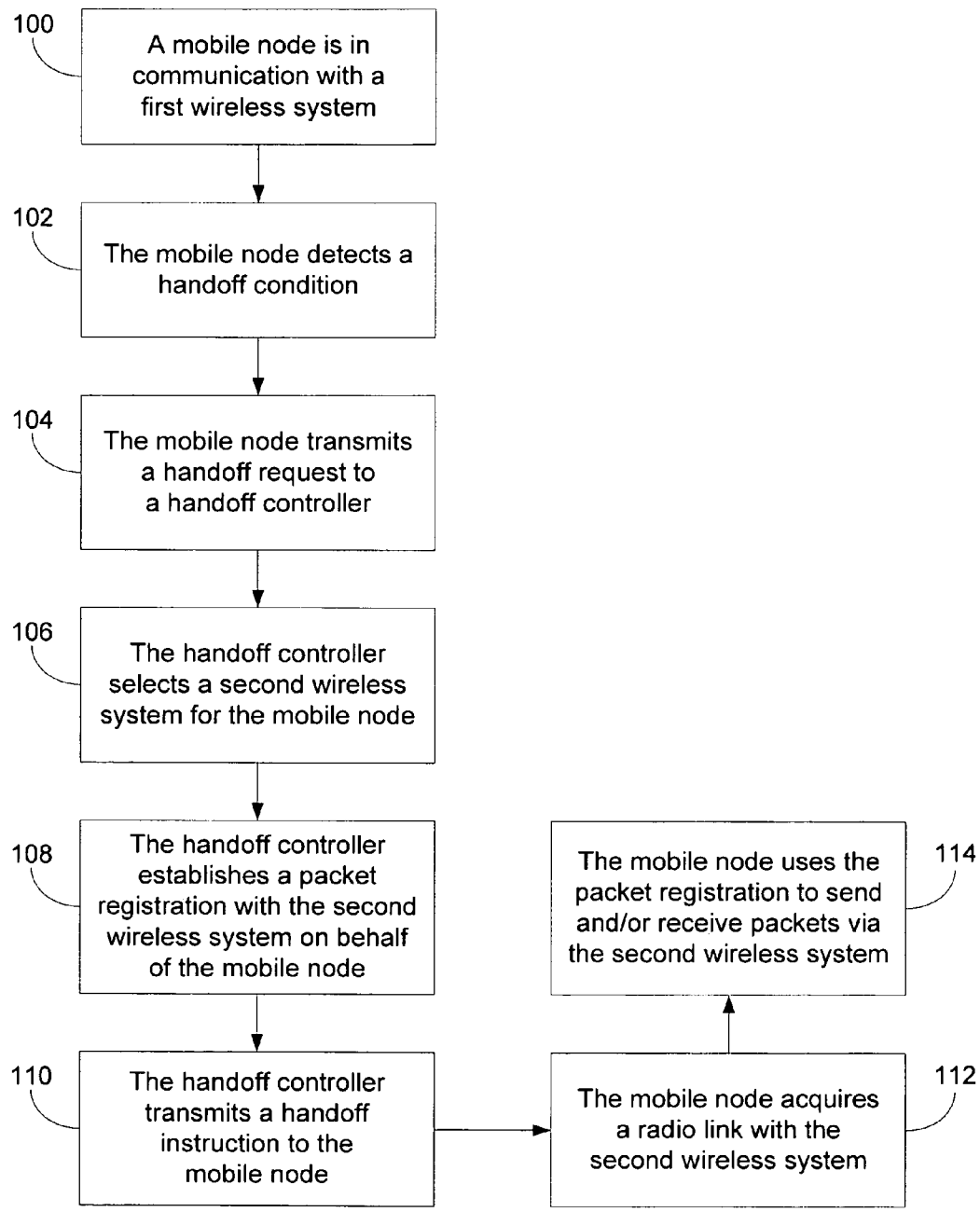
FIG. 2 is a flow chart illustrating a handoff of a mobile node from a first wireless system to a second wireless system, in accordance with an exemplary embodiment of the present invention.

FIG. 2 is a flow chart illustrating an exemplary process for a handoff of a mobile node from a first wireless system to a second wireless system. The process shown in FIG. 2 may use the network architecture shown in FIG. 1. Thus, the first wireless system may correspond to WLAN 14, and the second wireless system may correspond to WWAN 16. Alternatively, however, other network architectures could be used.

The process may begin with the mobile node in communication with the first wireless system, as indicated by block 100. At this stage, the mobile node might be involved in a communication session in which the mobile node exchanges packets with an endpoint, e.g., via packet-switched network 12. The payloads of the packets could be, for example, voice, data, video or other media.

Alternatively, the mobile node might not be involved in a communication session. Instead, the mobile node could be in communication with the first wireless system by monitoring transmissions from the first wireless system.

At some point, the mobile node detects a handoff condition, as indicated by block 102. A handoff condition may indicate that a handoff to another wireless system may be advisable, for example, because the mobile node is moving out of the wireless coverage area of the first wireless system. The mobile node may detect a handoff condition in various ways. In some embodiments, the mobile node may monitor a signal level from the first wireless system and compare the signal level to a predetermined threshold value. A handoff condition may be indicated when the signal level reaches or falls below the predetermined threshold value. In other embodiments, the mobile node may compare a signal level from the first wireless system with signal levels from one or more other wireless systems to determine when a handoff condition is indicated.

In response to detecting a handoff condition, the mobile node may transmit a handoff request to a handoff controller, via the first wireless system, as indicated by block 104. The handoff request may include various types of information. For example, the handoff request may include one or more credentials used by the mobile node, such as the mobile node's "home" IP address, network access identifier (NAI), and home agent IP address. The handoff request may also identify the first wireless system, e.g., by SSID and/or MAC address, or may include a GPS location of the mobile node. In some embodiments, the handoff request may identify one or more wireless systems as potential candidates for handoff and may include signal levels that the mobile node has measured for such wireless systems.

The handoff controller may receive the handoff request and responsively select a second wireless system for the mobile node, as indicated by block 106. The handoff controller could select the second wireless system based on information contained in the handoff request. For example, the handoff request may select a second wireless system that is known to have a wireless coverage area that overlaps the wireless coverage area of the first wireless system identified in the handoff request. Alternatively, the handoff request may identify one or more candidate systems, and the handoff controller may select the second wireless system from among the candidate systems.

The handoff controller may then establish a packet registration with the second wireless system on behalf of the mobile node, as indicated by block 108. The packet registration could, for example, allow the second wireless system to recognize the mobile node as being registered for packet-data service and, therefore, enable the mobile node to send and/or receive packets via the second wireless system.

The process of establishing the packet registration may involve a number of steps, such as negotiation of a data link, authentication, and registration of the mobile node's "home" IP address, as described in more detail below. In this process, the handoff controller may transmit signals to and respond to signals from the second wireless system as if the handoff controller were the mobile node, e.g., presenting the mobile node's "home" IP address, NAI, and/or other credentials corresponding to the mobile node. In case the handoff controller does not have a necessary credential from the mobile node, such as a password, the handoff control may forward messages from the second wireless system to the mobile node and forward the mobile node's responses to the second wireless system.

While the handoff controller is in the process of establishing the packet registration with the second wireless system, the mobile node may remain in communication with the first wireless system. That way, if the mobile node is involved in a communication session via the first wireless system, the mobile node can wait until the packet registration needed to support the communication session via the second wireless system is in place before connecting to the second wireless system.

When the packet registration has been established, the handoff controller may transmit a handoff instruction to the mobile node, via the first wireless system, as indicated by block 110. The handoff instruction may instruct the mobile node to change its point of connection from the first wireless system to the second wireless system.

How the mobile node responds to the handoff instruction may depend, for example, on whether the mobile node was involved in an on-going communication session via the first wireless system. To continue a communication session via the second wireless system, the mobile node may acquire a radio link with the second wireless system in response to the handoff instruction, as indicated by block 112. To acquire a radio link, the mobile node could, for example, transmit an origination message to the second wireless network. The mobile node may then use the packet registration established by the handoff controller to send and/or receive packets via the second wireless system, as indicated by block 114.

If, however, the mobile node was not involved in a communication session via the first wireless system, the mobile node may simply begin monitoring transmissions from the second wireless system in response to the handoff instruction. In such cases, the mobile node might not use the packet registration until the mobile node needs to enter an active state, for example, to originate or terminate a communication session. Because the packet registration may have a limited lifetime, the mobile node may periodically communicate with the second wireless system to renew the packet registration.

Figure 3:
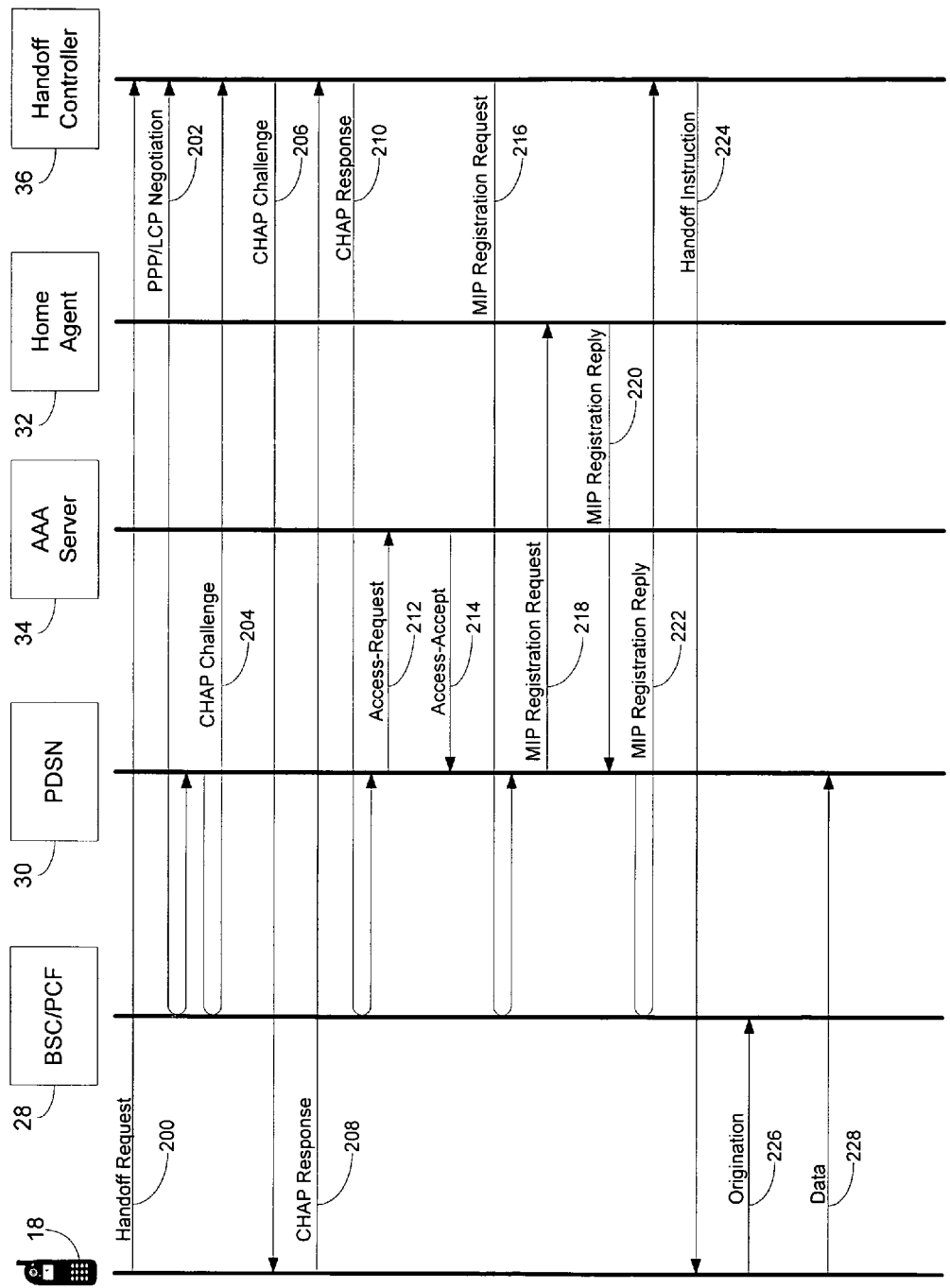
FIG. 3 is a simplified call flow diagram illustrating a handoff of a mobile node from a first wireless system to a second wireless system, in accordance with an exemplary embodiment of the present invention.

FIG. 3 illustrates, in a simplified fashion, an exemplary call flow for a handoff of mobile node 18 from a first wireless system, comprising wireless access point 20, to a second wireless system, comprising BTS 24, BSC/PCF 28, and PDSN 30. In this example, mobile node 18 starts out involved in a communication session via wireless access point 20 and without a packet registration with the second wireless system. In addition, mobile node 18 uses Mobile IP in this example, so home agent 32 initially stores an association between the home address of mobile node 18 and a care-of address of wireless access point 20 (as the foreign agent serving the first wireless system).

At some point, mobile node 18 determines that a handoff condition is indicated, e.g., by detecting a signal level of wireless access point 20 falling below a predetermined threshold value, and responsively transmits a handoff request to handoff controller 36, as indicated by step 200. The handoff request may include an SSID or MAC address of wireless access point 20, and various credentials for mobile node 18, such as home address, NAI, and IP address of home agent 32.

Handoff controller 36 may receive the handoff request via WLAN 14 and packet-switched network 12. In response to the handoff request, handoff controller 36 may select a second wireless system for mobile node 18. For example, handoff controller 36 may use the SSID or MAC address to consult database 38 and, thereby, determine that BSC/PCF 28 serves the area in which wireless access point 20 is located.

Handoff controller 36 then negotiates a data link with BSC/PCF 28, using the PPP Link Control Protocol (LCP), and BSC/PCF 28 extends the PPP/LCP negotiation to PDSN 30, as indicated by step 202. Once the PPP/LCP phase is completed, PDSN 30 may require authentication before proceeding to the next PPP phase, the Network-Layer Protocol Phase. For example, PDSN 30 may use the Challenge Handshake Authentication Protocol (CHAP) to send a CHAP challenge to handoff controller 36, via BSC/PCF 28, as indicated by step 204. The CHAP challenge may include a Challenge Value.

Handoff controller 36 may forward the CHAP challenge to mobile node 18, as indicated by step 206. Mobile node 18 may receive the CHAP challenge, via packet-switched network 12 and WLAN 14, and calculate a Response Value. The Response Value could be, for example, a one-way hash of the NAI and password of mobile 18, concatenated with the Challenge Value. The mobile node 18 may then transmit a CHAP response to handoff controller 36 that includes the Response Value, as indicated by step 208. Handoff controller 36 may forward the CHAP response to PDSN 30, via BSC/PCF 28, as indicated by step 210.

To authenticate handoff controller 36, acting as a proxy for mobile node 18, PDSN 30 may transmit a RADIUS Access-Request message to AAA server 34, as indicated by step 212. The Access-Request message may include the Challenge Value, the Response Value, and the NAI of mobile node 18. AAA server 34 may look up the password corresponding to the NAI and then calculate its own one-way hash from the NAI, password, and Challenge Value. If the result matches the Response Value included in the Access-Request message, authentication is successful and AAA server 34 transmits a RADIUS Access-Accept message to PDSN 30, as indicated by step 214. PDSN 30, BSC/PCF 28, and handoff controller 36 may then complete the establishment of the PPP link.

Once the PPP link is established, handoff controller 36 may do a Mobile IP registration on behalf of mobile node 18 by transmitting a Mobile IP Registration Request to PDSN 30, via BSC/PCF 28, as indicated by step 216. The Registration Request of step 216 may include the home address of mobile node 18 and the EP address of home agent 32. PDSN 30, acting as foreign agent, may send a corresponding Mobile IP Registration Request to home agent 32, as indicated by step 218. The Registration Request of step 218 may include a care-of address corresponding to PDSN 30, in addition to the home address of mobile node 18 and the IP address of home agent 32.

Home agent 32 may receive the Registration Request of step 218, via packet-switched network 12. If the Registration Request is acceptable, home agent 32 may transmit to PDSN 30 a Mobile IP Registration Reply indicating acceptance of the registration, as indicated by step 220. When PDSN 30 receives the Registration Reply, PDSN 30 may store an indication that mobile node 18 is now registered, e.g., by storing an association between the home address of mobile node 18, the IP address of home agent 32, and the IP address of BSC/PCF 28. PDSN 30 may also transmit a Mobile IP Registration Reply to handoff controller 36, via BSC/PCF 28, as indicated by step 222.

At that point, the packet registration for mobile node 18 with the second wireless system may be established. Mobile node 18 may be identified in that packet registration by its home address. As a result, BSC/PCF 28 and PDSN 30 may treat packets that include that home address as source address as packets originating from mobile node 18, as an authorized and registered mobile node.

With the packet registration for mobile node 18 now established, handoff controller 36 may transmit a handoff instruction to mobile node 18, as indicated by step 224. The handoff instruction may instruct mobile node 18 to connect to the second wireless system. Mobile node 18 may receive the handoff instruction via packet-switched network 12 and WLAN 14. In response to the handoff instruction, mobile node 18 may acquire a radio link with the second wireless system. For example, mobile node 18 may transmit an origination message, as indicated by step 226. BSC/PCF 28 may receive the origination message and may attempt to authorize mobile node 18 for radio resources. To perform this authorization step, BSC/PCF 28 may signal to a mobile switching center (MSC), which may, in turn, signal to a home location register (HLR). Alternatively, BSC/PCF 28 may authorize mobile node 18 for radio resources in other ways.

Once mobile node 18 has been authorized for radio resources, BSC/PCF 28 may assign traffic channels to allow mobile node 18 to transmit and receive data, e.g., via air interface 26. Mobile node 18 may then begin to transmit data, as indicated by step 228, in order to continue the communication session in which mobile node 18 was engaged via wireless access point 20.

The data transmitted in step 228 may be in the form of packets that include the home address of mobile node 18 as source address. PDSN 30 may recognize that the home address corresponds to the packet registration that handoff controller 36 established for mobile node 18 and, thus, that the packets originate from an authorized and registered mobile node. PDSN 30 may then forward the packets to their destination, e.g., to an endpoint via packet-switched network 12. The packet registration may also enable mobile node 18 to receive packets via PDSN 30. In particular, home agent 32 may receive packets that have the home address of mobile node 18 as destination address. Because of the registration established by handoff controller 36, home agent 32 has an association between this home address and a care-of address corresponding to PDSN 30. Thus, home agent 32 may forward the packets to PDSN 30, which, in turn, may forward the packets to mobile node 18.

By having the handoff controller 36 establish the packet registration for mobile node 18 in the second wireless system before mobile node 18 connects to the second wireless system, the time during which the mobile node 18 is transitioning from the first wireless system to the second wireless system and, thus, unavailable to send or receive packets, may be reduced. For example, the transition time could be the time between when mobile node 18 receives the handoff instruction and the mobile node receives traffic channels in response to the origination message of step 226. During this transition time, home agent 32 and/or PDSN 30 may buffer packets that are destined for mobile node 18.

At some point, mobile node 18 may re-connect to WLAN 14. However, the re-connection may not necessarily involve handoff controller 36. In particular, handoff controller 36 may mediate handoffs from WLAN 14 to WWAN 16, but not vice-versa. Nonetheless, after mobile node 18 re-connects to WLAN 14, mobile node 18 may notify handoff controller 36.

FIG. 3 illustrates an exemplary call flow for a handoff-controller mediated handoff from a WLAN system to a WWAN system. However, it is to be understood that handoff controllers could be used to mediate handoffs between other types of wireless systems. The handoff controller might mediate handoffs in only one direction, as noted above, or in both directions.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A handoff method for a mobile node, said mobile node being in communication with a first wireless system, said method comprising:
   a handoff controller receiving a handoff request from said mobile node via said first wireless system, wherein said handoff request includes a system identifier of said first wireless system;
   in response to said handoff request, said handoff controller selecting a second wireless system based on said system identifier contained in said handoff request;
   establishing a packet registration with said second wireless system on behalf of said mobile node by a process comprising said handoff controller transmitting a first registration message to a foreign agent serving said second wireless system and said foreign agent responsively transmitting a second registration message to a home agent; and
   said handoff controller transmitting a handoff instruction to said mobile node via said first wireless system.

2. The method of claim 1, wherein said first wireless system is in a wireless local area network (WLAN) and said second wireless system is in a wireless wide area network (WWAN).

3. The method of claim 1, wherein said mobile node communicates with said first wireless system via a first air interface protocol and communicates with said second wireless system via a second air interface protocol.

4. The method of claim 3, wherein said first air interface protocol is an 802.11 protocol and said second air interface protocol is an EV-DO protocol.

5. The method of claim 1, wherein said first registration message identifies said home agent and includes a home address of said mobile node.

6. The method of claim 5, wherein said second registration message includes said home address of said mobile node and a care-of address corresponding to said foreign agent.

7. The method of claim 6, further comprising:
   said home agent receiving said second registration message and responsively storing an association between said home address and said care-of address.

8. The method of claim 7, wherein a packet data serving node (PDSN) functions as said foreign agent.

9. The method of claim 8, further comprising:
   said handoff controller establishing a data link with said PDSN via a packet control function of said second wireless system.

10. The method of claim 8, further comprising:
    said handoff controller receiving an authentication challenge from a challenger; and
    said handoff controller forwarding said authentication challenge to said mobile node.

11. The method of claim 10, further comprising:
    said handoff controller receiving an authentication response from said mobile node; and
    said handoff controller forwarding said authentication response to said challenger.

12. The method of claim 10, wherein said challenger is said PDSN.

13. A system for controlling a handoff of a mobile node from a first wireless system to a second wireless system, said system comprising:
    a packet data serving node (PDSN) serving said second wireless system;
    a database that stores information regarding a plurality of wireless systems; and
    a handoff controller communicatively coupled to said database via a packet-switched network, wherein, in response to receiving from said mobile node a handoff request that includes a system identifier of said first wireless system, said handoff controller is configured to consult said database to select said second wireless system based on said system identifier contained in said handoff request, establish a packet registration with said second wireless system on behalf of said mobile node by communicating with said PDSN, and transmit a handoff instruction to said mobile node.

14. The system of claim 13, further comprising:
    a packet control function (PCF) in said second wireless system, wherein said handoff controller is configured to establish said packet registration with said second wireless system on behalf of said mobile node by communicating with said PDSN via said PCF.

15. A method for controlling a handoff of a mobile node, said method comprising:
    a handoff controller receiving a handoff request from said mobile node via a first wireless system, wherein said handoff request includes a system identifier of said first wireless system;
    in response to said handoff request, said handoff controller selecting a second wireless system based on said system identifier contained in said handoff request;
    said handoff controller receiving an authentication challenge from a node serving said second wireless system;
    said handoff controller forwarding said authentication challenge to said mobile node;
    said handoff controller receiving an authentication response from said mobile node;
    said handoff controller forwarding said authentication response to said node serving said second wireless system; and
    said handoff controller transmitting a handoff instruction to said mobile node, wherein said handoff instruction instructs said mobile node to connect to said second wireless system.

16. The method of claim 15, wherein said node serving said second wireless system is a packet data serving node (PDSN).

17. The method of claim 16, further comprising:
    said handoff controller transmitting a registration request to said PDSN, wherein said registration request is configured to request a packet registration on behalf of said mobile node; and
    said handoff controller receiving a registration reply from said PDSN, wherein said registration reply indicates acceptance of said packet registration on behalf of said mobile node,
    wherein said handoff controller transmits said handoff instruction in response to receiving said registration reply.

18. The method of claim 17, wherein said packet registration is a Mobile IP registration.

19. The method of claim 16, wherein said handoff controller communicates with said PDSN via a packet control function (PCF) in said second wireless system.

* * * * *